United States Patent [19]
Elsenheimer et al.

[11] Patent Number: 5,456,149
[45] Date of Patent: Oct. 10, 1995

[54] SIZING SYSTEM FOR WINDOW COVERINGS

[75] Inventors: John A. Elsenheimer; Jeffrey L. Sands; Joseph S. Cannova; Timothy K. Riddle, all of Freeport, Ill.

[73] Assignee: Newell Operating Co., Del.

[21] Appl. No.: 19,033

[22] Filed: Feb. 18, 1993

[51] Int. Cl.⁶ .................................................. B26D 7/28
[52] U.S. Cl. ........................ 83/564; 83/167; 83/522.19; 83/859; 83/929; 29/24.5; 29/560
[58] Field of Search ........................ 83/167, 513, 516, 83/522.19, 552, 553, 559, 563, 564, 598, 701, 859, 929, 953; 29/24.5, 433, 560

[56] References Cited

U.S. PATENT DOCUMENTS

| | | | |
|---|---|---|---|
| 2,057,488 | 10/1936 | Hochstadt | 83/167 X |
| 3,260,146 | 7/1966 | Child | 83/559 X |
| 3,263,544 | 8/1966 | Margolien | 83/522.19 X |
| 4,819,530 | 4/1989 | Huang | 83/516 X |
| 4,907,325 | 3/1990 | Hsu | 83/425.2 X |
| 4,987,765 | 1/1991 | Nishimura et al. | 83/563 X |
| 4,993,131 | 2/1991 | Graves et al. | 29/24.5 |
| 5,037,253 | 8/1991 | Molaro et al. | 29/24.5 X |
| 5,072,494 | 12/1991 | Graves et al. | 29/24.5 |
| 5,215,512 | 6/1993 | De Dompierre | 83/563 X |

*Primary Examiner*—Eugenia Jones
*Attorney, Agent, or Firm*—Foley & Lardner

[57] ABSTRACT

The present invention relates to a compact, multi-station system for sizing window coverings such as roller shades, mini blinds, pleated shades and vertical blinds. The system includes devices for cutting components of each of the types of shades and coverings to correct window dimensions and an arrangement for presenting to a system operator, the cutting equipment for a particular application. In its most preferred form, the system includes four (4) stations with a flip-top horizontal surface containing sizing equipment on opposed sides. The most preferred system also includes fixed cutters, e.g. for roller shades and for cutting the head rail of vertical blinds. In the most preferred embodiment, the system also includes storage space for product to be sized.

4 Claims, 4 Drawing Sheets

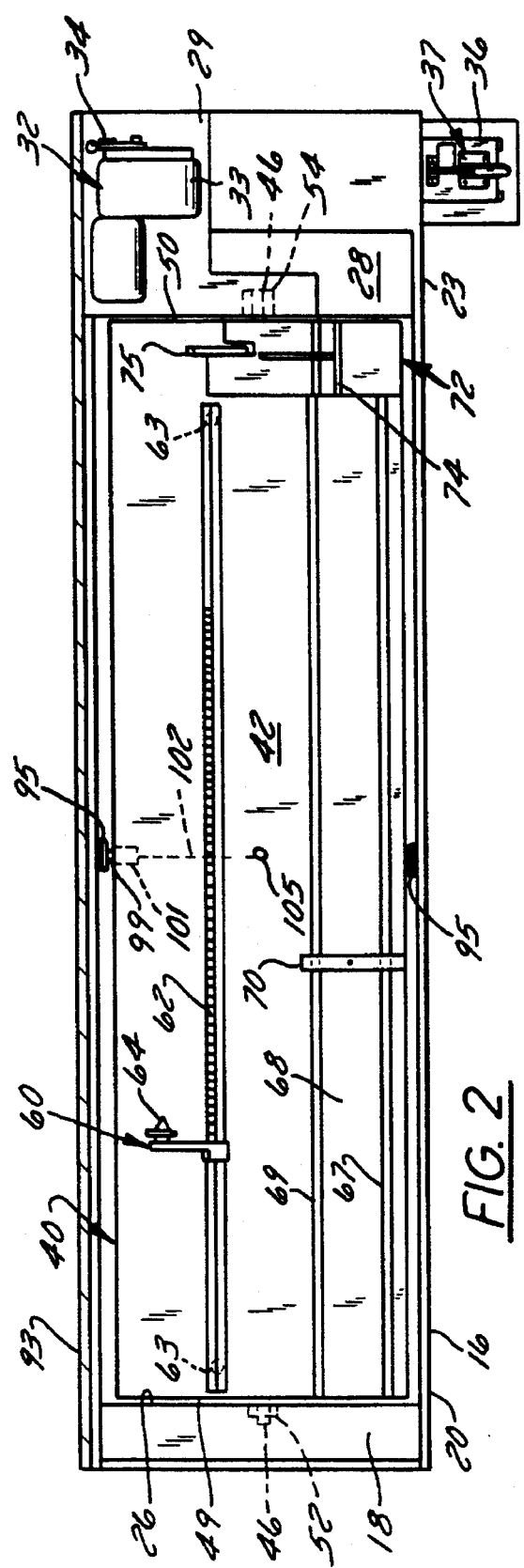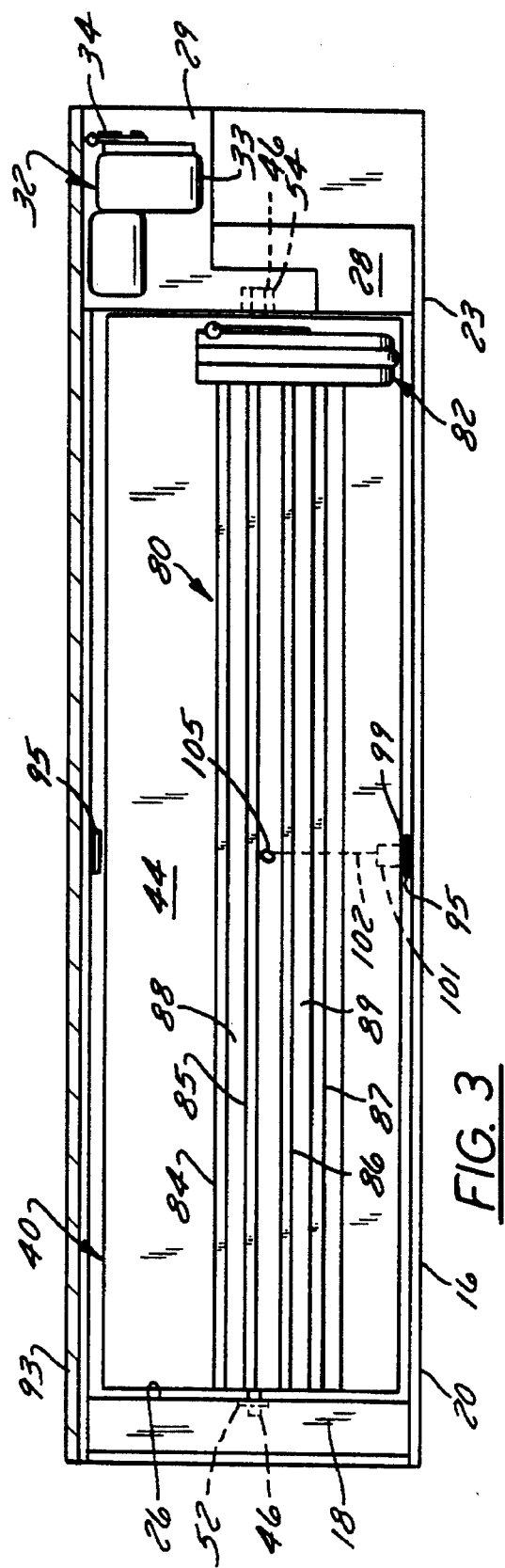

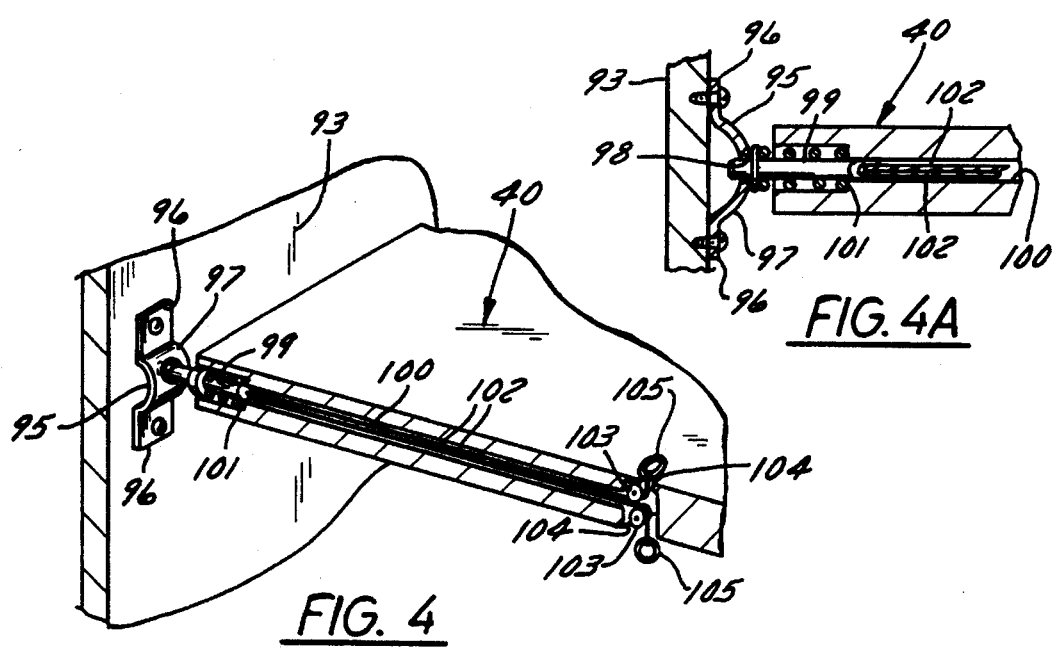
FIG. 4A
FIG. 4
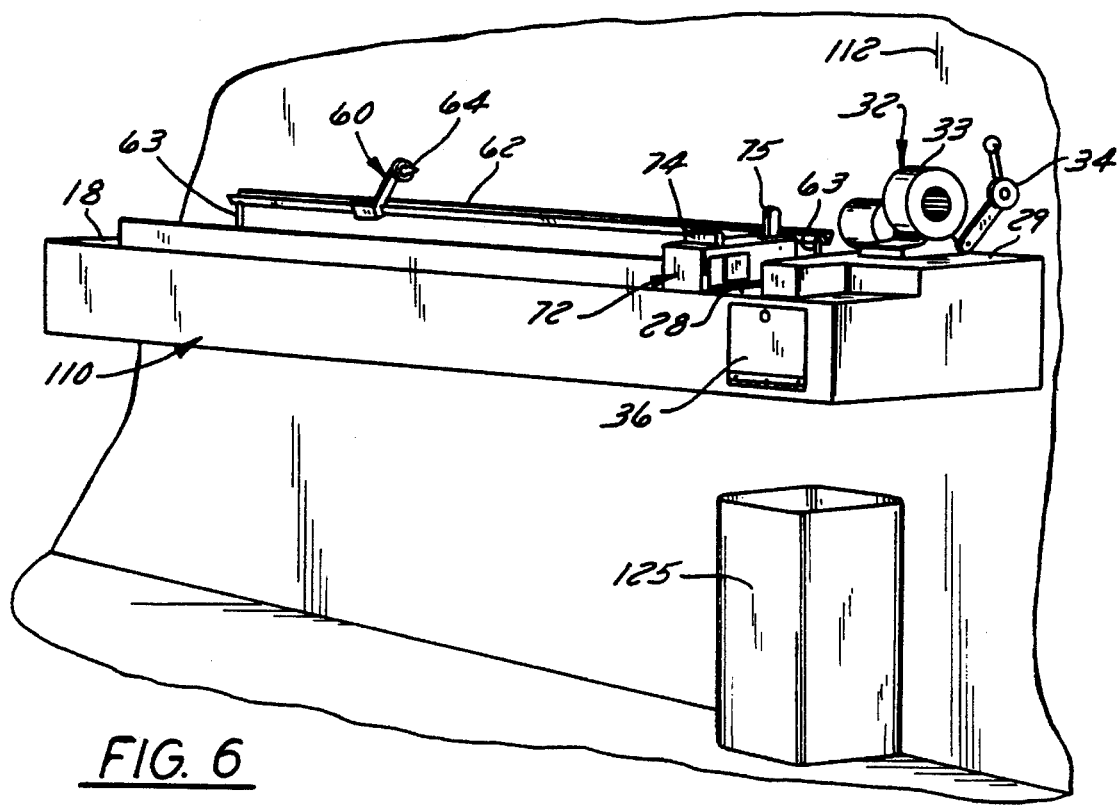
FIG. 6

SIZING SYSTEM FOR WINDOW COVERINGS

BACKGROUND OF THE INVENTION

1. Field of the Invention

The present invention relates generally to the art of sizing window coverings, including such window coverings as roller shades, mini blinds, pleated shades and vertical blinds. More particularly, the present invention relates to a compact system for sizing a variety of window coverings, and in its most preferred form, the invention includes a flip-top surface which contains a pleated shade sizing station on one side and a mini blind sizing station on the other. In the preferred embodiment, roller shade and vertical shade sizing devices are included in the system.

2. Description of the Prior Art

Numerous types of window coverings are now being sold in a variety of outlets. Window coverings of the type with which the present invention is concerned include roller shades, pleated shades, mini blinds and vertical blinds, as opposed to draperies and curtains which may be sold in the same outlets but which involve different sizing requirements.

The types of outlets which sell such window coverings include custom specialty shops and department stores, which usually ask the customer for window dimensions and then submit orders to factories or distribution centers where the products are cut to a specific size. Not only must the customer make two visits to these outlets to obtain the product, the custom window coverings are relatively expensive.

Mass merchandisers also distribute window coverings. In many such outlets only stocked sizes are carried, because some windows, especially in newer homes and offices, are of standard dimensions. These window coverings are usually much less expensive than those obtained from custom outlets because of the economies realized from carrying a limited stock of sizes and because there are no sizing operations which must be performed on the products.

In recent years, a third option has been made available to the consumer. This option involves the in-store sizing of window coverings to customer specifications. An example of how in-store sizing is accomplished can be appreciated by reference to commonly-owned U.S. Pat. No. 5,072,494 issued Dec. 17, 1991 to Graves, et al. for "Method And Apparatus For Infinitely Sizing A Mini Blind" and its parent U.S. Pat. No. 4,993,131 issued Feb. 19, 1991 to the same inventors and with the same title. In the device shown in these patents, mini blinds of a specific design are sized to customer specifications on a machine. The mini blind itself includes a head rail, a bottom rail, a plurality of slats, a tilter bar and a rope system for raising and lowering the blind and for locking the blind in a desired open or closed orientation. The mini blind product used with the system illustrated in these two patents includes one ladder (the rope system having slat supports and a hole though each slat to facilitate spacing and the raising and lowering of the blind) fixed in place. The other ladder is not installed at the factory, but is placed over the slats near the installed ladder.

To custom size the mini blind in the store, the blind is cut on one side, with the cutting apparatus passing through the head rail, bottom rail and each of the individual slats. A drill is then used to provide holes in each of the blind slats at a location picked by the operator to match the spacing of the installed ladder, so that the two ladders are spaced the same distance from the ends of the blind. The unsecured ladder is then moved into alignment with the holes and a cord is passed through the slats and secured at the bottom rail. The completed mini blind is then given to the customer. This sizing device, while commercially successful, is relatively expensive and may be somewhat difficult to learn to operate by new employees. Still, the customer is provided with a finished product in a fraction of the time it would normally take to customize a blind and secures his or her purchase without having to leave the store.

Other types of systems have been developed to customize window coverings in retail outlets. For example, Star Shade Cutter Co. has sold equipment for several years for cutting roller shades to desired dimensions. Such devices include a motor driven section which includes a saw for cutting the roller shade at an appropriate location and a support spaced therefrom.

Another system has been developed for sizing pleated shades as described in co-pending, commonly assigned U.S. patent application Ser. No. 07/790,290 filed on Nov. 8, 1991 and entitled "Size-In-Store Pleated Shade And Apparatus and Method For Sizing" in the name of Graves, et al. In this device, a platform is provided which includes a number of spaced apart and parallel channels for holding pleated shades including the head rail, bottom rail and the pleated fabric (cloth, fabric or the like) for allowing it to slide back and forth along the channels to a cutting station. Half scale and full scale rulers are provided so that a pleated shade longer than required by the customer can be cut first on one side and then on the other to provide symmetry with the hardware and the mechanisms for raising and lowering such shade devices. Different cutting devices are used for cutting the pleats than are used to cut the head and bottom rails.

Vertical blinds also represent a significant portion of the window covering market and are popular for such applications as patio door coverings and the like. Devices are known for in-store sizing of such products, where the head rail is cut for a particular application. Typically, the height of vertical blinds does not vary substantially, and it is not always necessary to cut the individual slats. However, once the head rail is cut, the slats could be cut by equipment known to the art to a specific height.

A major problem with in-store sizing of window coverings is employee training. Speed of operation is also of great importance and, in these days of low margin mass merchandising, a primary concern is the amount of space required to store product to be sized and to perform the sizing operations. The more space that is required for different sizing operations, the less space is available for other products or the storage of the window covering product itself. Even with in-store sizing, a variety of stocked sizes of each product type needs to be maintained, as well as an appropriate selection of colors and materials. For example, mini blinds come in a variety of colors, as well as in two major material categories, i.e. aluminum and vinyl. A system which would provide the merchandiser with the opportunity of providing in-store sizing for a variety of window coverings in a compact area would represent a significant advance in this art.

SUMMARY OF THE INVENTION

The present invention features a multi-operational, compact system for sizing a plurality of window coverings at a single location. The present invention also features the ability to combine the sizing equipment with display and storage components. The present invention also features the ability to select two, three, four or more sizing operations within a comparatively small space when measured against the space required by current equipment for performing the individual sizing operations.

How the features of the present invention are accomplished will be described in the following detailed description of the preferred and alternate embodiments, taken in conjunction with the drawings. Generally, however, the features are accomplished using a window covering sizing system which involves at least one mechanical device for presenting at a single location a plurality (in this specification meaning two or more) of sizing machines. In the most preferred embodiment, the features are provided on a surface which includes a conventional roller shade cutting device mounted at a fixed location, with a remote section of that machine mounted on a first movable surface. The first movable surface also includes a device for sizing another type of window covering, for example, a mini blind sizing device. The first movable surface is locked into position for safety and for accurately performing the sizing operations using either of these two pieces of equipment. The locking mechanism may be released to permit the first movable surface to be replaced by a second movable surface (in the most preferred embodiment, the second movable surface is the back side of the first movable surface) for performing yet another cutting operation, e.g. the sizing of pleated window coverings.

The features may also be accomplished by providing one or more additional cutting or sizing machines at locations which are integrated with the above-described system to provide a complete range of in-store sizing capabilities in a small amount of space.

Other ways in which the features of the invention are accomplished will become apparent to those skilled in the art after the present specification is read and understood.

DESCRIPTION OF THE DRAWINGS

FIG. 2 is a top plan view of the system shown in FIG. 1 and illustrating the roller shade, mini blind cutter, and vertical blind cutting device in generally schematic form;

FIG. 3 is a top plan view, similar to FIG. 2, but showing the rotation of the mini blind cutter and a portion of the roller shade cutter to present a pleated shade sizing system at the same location;

FIG. 4 is a perspective view showing a preferred technique for locking the movable surface of the device illustrated in FIGS. 1–3;

FIG. 4A is a cross-sectional view of the preferred technique for locking the movable surface of the device illustrated in FIGS. 1–3;

FIG. 6 is a perspective view of a multi-operational window covering sizing station suitable for mounting in a warehouse environment and involving a frame and a rotatable surface, without display or product storage components.

In the various FIGURES, like reference numerals are used to denote like components.

DETAILED DESCRIPTION OF THE PREFERRED AND ALTERNATE EMBODIMENT

Before beginning the detailed description of the FIGURES and the preferred and alternate embodiments shown therein, several general comments will assist in understanding the scope of the invention.

The most preferred and illustrated embodiment includes separate stations for cutting roller shades, sizing mini blinds, sizing pleated shades and sizing vertical blinds. These are products which are typically sold through the same retail outlets and for which there is significant demand. In the illustrated embodiment, a portion of the roller shade cutter and the vertical cutter are mounted in a fixed location and do not move when the flip-top work surface is moved from its first to its second position. However, the invention is broad enough in scope to cover a system in which three or four systems would each be mounted on separate surfaces of a rotatable device. Such systems are not as preferred as the illustrated system in that they would require greater space which, as mentioned in the introduction to this specification, is undesirable in many outlets. Moreover, it is possible and would be within the scope of the present invention to use systems such as that illustrated in FIG. 7, wherein a turn table concept is employed to move the various cutters in line with devices for holding and measuring the various window coverings. The cutting devices, because of the differences in the dimensions of the individual components, their handles, etc., would also require more space (greater diameter for the turntable). Finally, while separate drawings are provided to show a free-standing system for performing several operations (FIG. 6), it should be clearly understood at the outset that the preferred embodiment which includes display and storage capabilities is exactly that, preferred and not limiting. By providing product display information and storage within the unit, however, space utilization is optimized, especially in the area below the flip-top surface of the preferred embodiment.

Figure 1:
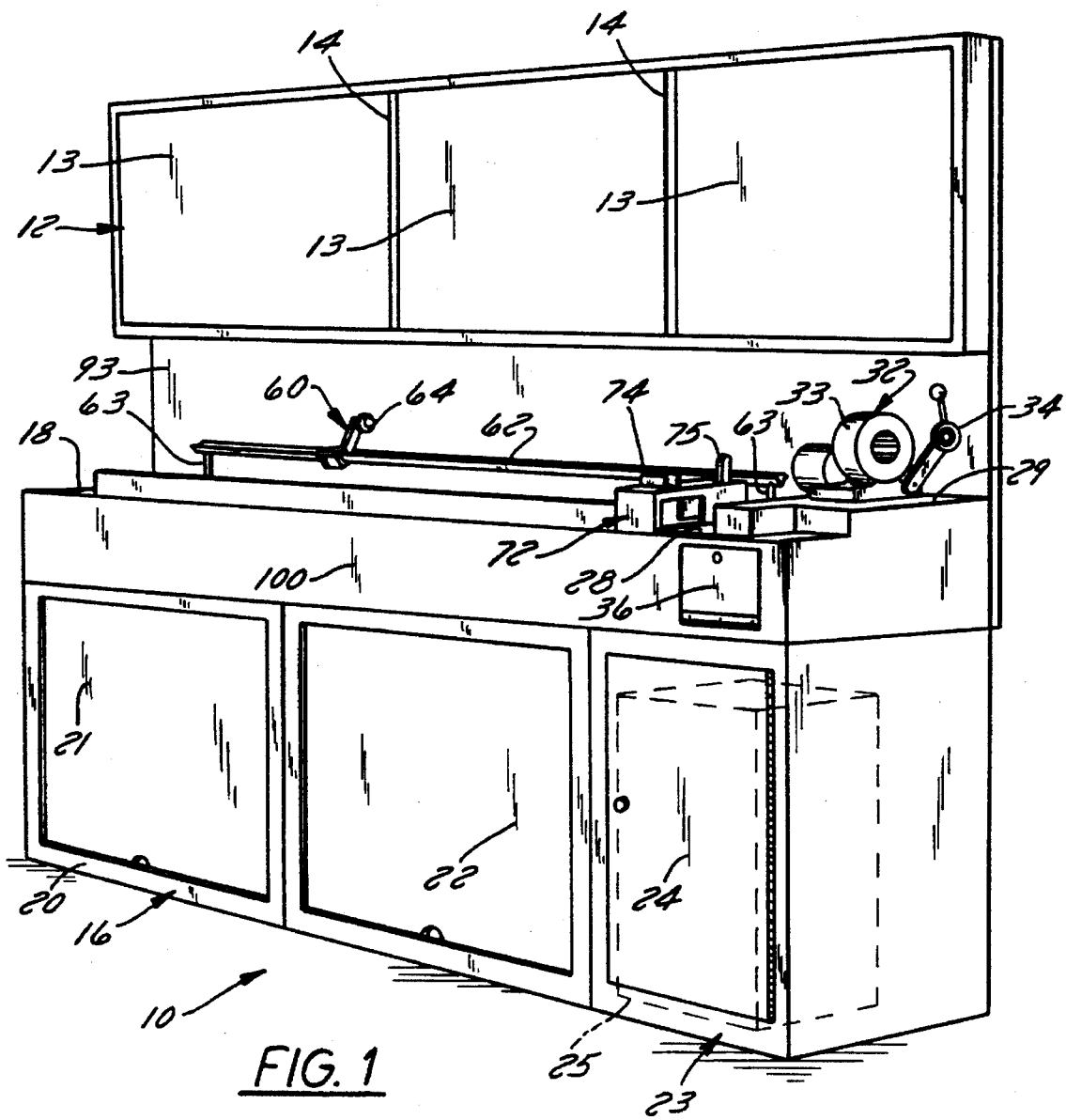
FIG. 1 is a perspective view of a four-station in-store sizing system according to the most preferred form of the present invention, including display and product storage components which are optional for the present invention.

Referring next to FIG. 1, a multi-operation, window covering sizing system 10 is shown in perspective form to include a relatively thin and generally rectangular vertical display area 12, which may be subdivided into a plurality of display panels 13 by dividers 14. Preferably, panels 13 each include a light panel for illuminating displays. System 10 also includes a storage area 16 extending below a horizontal work surface 18 to the floor. In the most preferred form of the invention, the depth of area 16 and of the surface 18 is approximately 2 feet, and the overall length of system 10 is approximately 8 feet. System 10, in its most preferred form, is designed to fit within a 2 foot×8 foot×7 foot area such as those typically encountered in mass merchandising and home improvement warehouse stores. Storage area 16 includes a larger side 20 with two pairs of sliding doors 21 and 22, and a smaller side 23, at the right-hand side as shown in the FIGURE, with a door 24 to receive a trash receptacle (shown in phantom at 25), the purpose of which will become apparent as the description of system 10 continues.

Surface 18 includes a generally rectangular cut out 26 having dimensions of approximately six feet by 22 inches or so, cut out 26 being located generally above side 20 of storage area 16. The remainder of surface 18 includes an opening 28 and an elevated, generally horizontal sizing device support area 29. Opening 28 is located above side 23, and as will be appreciated later, allows portions of window coverings which are removed during sizing operations to be deposited into the trash receptacle 25.

Located on area 29 of surface 18 is a roller shade cutter 32, shown schematically since the construction of the particular sizing devices to be described here are not, in and of themselves, essential to an understanding of the invention. Generally, however, the cutter 32 could be a roller shade cutter manufactured by Star Shade Cutter Co. of St. Joseph, Michigan, Model No. M-200. Cutter 32 is arranged so that the portion 33 thereof designed to receive the core and wraps of shade material will align a roller shade so that its axis will extend longitudinally of surface 18 and parallel to the front and back edges thereof. A pivotable cutter for this device is depicted at 34 in FIG. 1.

Located on the front of side 23 is a pull out drawer 6 for supporting a second window covering sizing device 37 (see FIG. 2). In the illustrated embodiment, device 37 is schematically shown as a device for sizing vertical blinds, i.e. for cutting the head rail and tilter bar of the vertical blinds to the desired length. Again, the particular construction thereof is not pertinent to an understanding of the present invention.

Continuing with the description of sizing system 10, reference should next be made to FIGS. 1–3 to note the presence of a rotatable, double sided element 40 adapted to fit within cut out 25 and arranged so that one of its two sides 42 or 44 can be presented upwardly and generally in a coplanar relationship with surface 18. Sides 42 and 44 are parallel to one another.

In FIG. 2, side 42 is shown in the operative or upwardly facing position, while in FIG. 3, the side 44 is shown facing upwardly. Rotation of element 40 is made possible by having rods 46 extend from each of the ends 49 and 50 of element 40. When viewed in these FIGURES, rod 46 at the left end is journaled in a simple pillow block bearing 52, while the other rod 46 at end 50 is mounted in a compression bearing 54 which permits rotation but provides some resistance thereto. As will soon become apparent, different mechanical systems will be placed on sides 42 and 44 and operator pressure may be exerted on sides 42 and 44 during use. While a latching mechanism will be illustrated, the purpose of bearing 54 is to prevent sudden free rotation of element 40 in the event the latching mechanism does not function. Also, when it is time to switch from side 42 to side 44 smoother rotation is facilitated. As illustrated best in FIG. 2, system 10 includes a second component of the roller shade cutter 32, i.e. a spindle 60, mounted for sliding movement along a ruler 62. Ruler 62, in turn, is supported above surface 42 by a pair of legs 63 (shown best in FIG. 1). One end of the roller shade extends over a point 64 of the spindle 60, and the spindle is moved to the desired cutting length along ruler 62, at which time the pivotable cutter 33 is operated to sever material from the opposite end of the shade. It should be noted that the ruler 62 is at the rear of surface 42 so that it is aligned with the receiving opening 33 of the cutter 32.

Toward the forward edge of side 42 is a mini blind sizing system which includes, in the schematic illustration, a pair of raised, parallel and spaced apart measurement rods 67 and 69. Rods 67 and 69 are also parallel to the front and back edges of element 40 and terminate short of end 50 thereof. The channel 68 formed between rods 67 and 69 is bridged by a sliding end plate 70, the use of which will be described shortly. The other end of channel 68 is open to the anvil of a cutter 72, having a cutter blade (not shown). The cutter blade is activated by handle 75 to move the cutter through the mini blinds components to size them. A clamp mechanism is shown generally at 74.

As is known in the sizing art, and for purposes of illustrating one particular type of mini blind sizing system which may be used with the present invention, mini blinds can be prepared in stock lengths, with room on either end for removal of equal amounts of material to provide customized, smaller blinds. One of the rods, e.g. rod 67, is a half-width measuring rod and is used for making the first cut. The other rod 69 is a full-width rod and will be used for the final cut.

Whether the mini blind to be sized is aluminum, vinyl or any other material, it is placed with its head rail, bottom rail and slats in channel 68 and between rods 67 and 69 and with all components abutting plate 70. The end plate 70 is moved to the desired location on the half width rod 67. The clamp 74 secured and cutter 72 is then operated to trim from the right end of the mini blind the desired amount of material. Following this step the blade is retracted, the clamp 74 is released and the mini blind is removed from channel 68. The mini blind is then reversed in orientation and placed so that the freshly cut end abuts end plate 70. At this point, end plate 70 is moved to the desired location on the full width rod 69 and the clamping and cutting steps are repeated. The rails and mini blind slats that are removed will fall through opening 28 and into the trash receptacle 25 as the knife cuts through the blinds.

The foregoing description is of an illustrated mini blind system which could include the cutter, described in the aforementioned Graves, et al. U.S. Pat. Nos. 4,993,131 and 5,072,494. Also, a deflector (not shown) can be mounted above opening 28 to prevent debris from being propelled toward the operator or a bystander. Preferably, such deflector should be easily removable, and could be made from transparent or translucent material such as metal, plastic and the like.

Now that three of the four sizing components contained within system 10 have been described, it is appropriate once again to mention that the specifics of any particular device are not critical to the broadest features of the present invention. For example, while the spindle 60 of the roller shade cutting device is mounted on surface 42 in the illustrated embodiment, it could as easily be mounted on surface 44. Also, vertical blind cutter 37 could be located below surface 18 in any portion of the side 20, without departing from the intended scope of the invention.

Focusing attention now on FIG. 3, side 44 of element 40 is presented upwardly and includes a pleated shade sizing system 80. This system, in and of itself, could be the system described in commonly assigned U.S. patent application Ser. No. 07/790,290 filed on Nov. 8, 1991 referred to earlier in the background section of this specification. It includes a handle operated cutter 82 which includes first and second portions (not shown), one of which is for cutting the head and bottom rail components and the other of which is for cutting the pleated material. Pleated shade sizing system 80 also includes a plurality of rulers 84–87 which together define two channels 88–89. The rulers will be appropriately marked in half and full width scales. One of channels 88 or 89 is used for cutting the head and bottom rails of the pleated shades, while the other is used for cutting the pleated material. The technique for cutting one type of pleated shade is described in detail in the aforementioned, commonly assigned patent application, which method and detailed description is specifically incorporated herein by this reference. Generally, however, the head rail and bottom rail are sized first by measuring the rails using half length rulers followed by cutting the opposite end using a full length ruler. The pleated material is then sized at both ends by first cutting one end using the half width ruler of its confining channel, following which the other end of the material is cut using the full width ruler. As was the case for the mini blind sizing system, material to be discarded is deposited through opening 28 into the receptacle therebeneath.

FIGS. 4 and 4A are sectional, partial views showing one type of locking mechanism suitable for use with element 40. Element 40 is perpendicular to a back wall 93 and a front wall 94 of sizing system 10 and mounted on each wall 93 and 94 is a latch 95. Each latch 95 includes base portions 96 screwed or otherwise attached to the wall and an extending portion 97 which arcs away from either wall 93 or wall 94 between base portions 96. Portion 97 includes an opening 98 constructed and arranged for receiving a spring loaded pin 99 disposed between sides 42 and 44. Element 40 preferably comprises two elements separated by a space 100. Spring loaded pin 99 is slidably disposed in a mounting bracket 101 attached to element 40 in space 100. Mounting bracket 101 is appropriately disposed so pin 99 will extend into opening 98 to hold element 40 perpendicular to walls 93 and 94. Pin 99 will cooperate with either latch 95 depending on whether side 42 or 44 is facing upward. Spring loaded pin 99 is disengaged from latch 95 by drawing it back against its spring until it clears latch 95. Preferably pin 99 is drawn back by one of a pair of drawstrings 102 which are attached to pin 99. Drawstrings 102 extend through space 100, around a pair of bearing surfaces 103, and out of element 40, each drawstring extending through a hole 104 in sides 42 and 44, respectively. Pulling one of the drawstrings will release element 40 for rotation about the axis of rods 46. Each drawstring 102 can be made from a variety of materials, such as cord, cable, or chain and may also include a ring 105 to facilitate pulling of the drawstring.

When it is desired to move element 40 to a different position, one of the drawstrings 102 is pulled to disengaged pin 99. Element 40 is then rotated until it can be held securely by pin 99 extending into the latch 95 disposed on the opposite wall.

Figure 5:
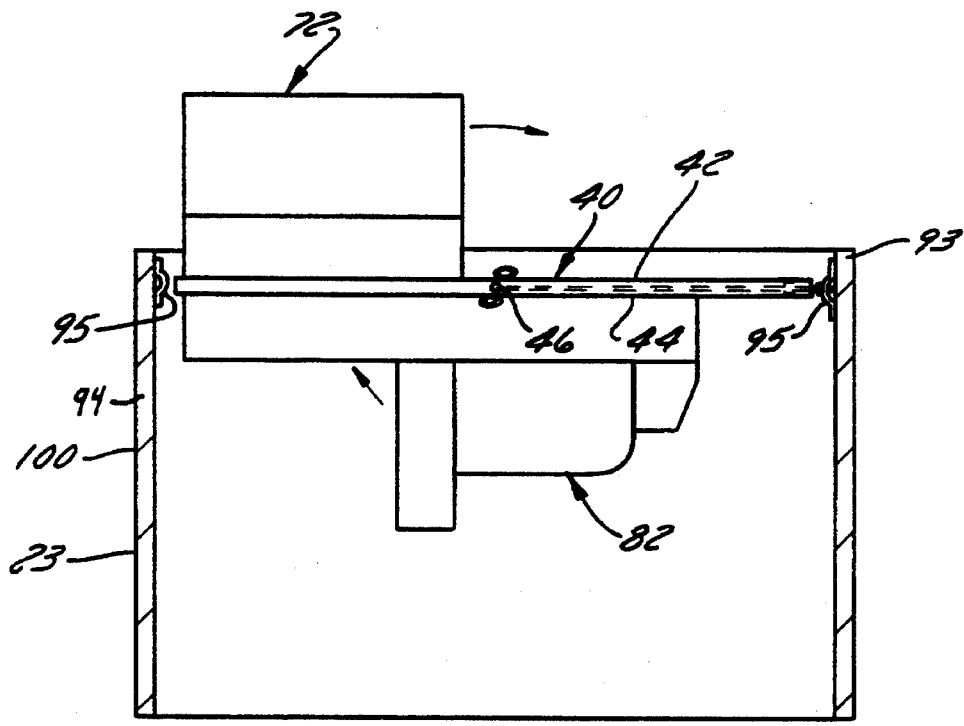
FIG. 5 is a schematic cross-section further illustrating the locking mechanism.

FIG. 5 shows schematically the rotation of element 40 with the element 40 being rotated around the axis of rods 46 between back wall 93 and front wall 94 of area 20 in the lower unit.

FIG. 6 is a perspective view of an alternate embodiment of the invention in which the lower storage areas are removed and a sizing station 110 is mounted on a wall 112, using brackets, screws, bolts or other attachment devices (not shown) as will be appreciated by those skilled in the art. Unit 110 differs from sizing system 10 only in the removal of the display areas and the storage compartments, unit 110 still providing the same four sizing options as existed with the previously described unit. FIG. 6 is illustrated to show the versatility of the present invention and its adaptability to certain merchandising outlets, including those with limited floor or vertical display space. A trash receptacle 125 is provided below the opening of this unit to catch discarded materials. The other components will not be described as to do so would be repetitious of earlier portions of the specification.

Figure 7:
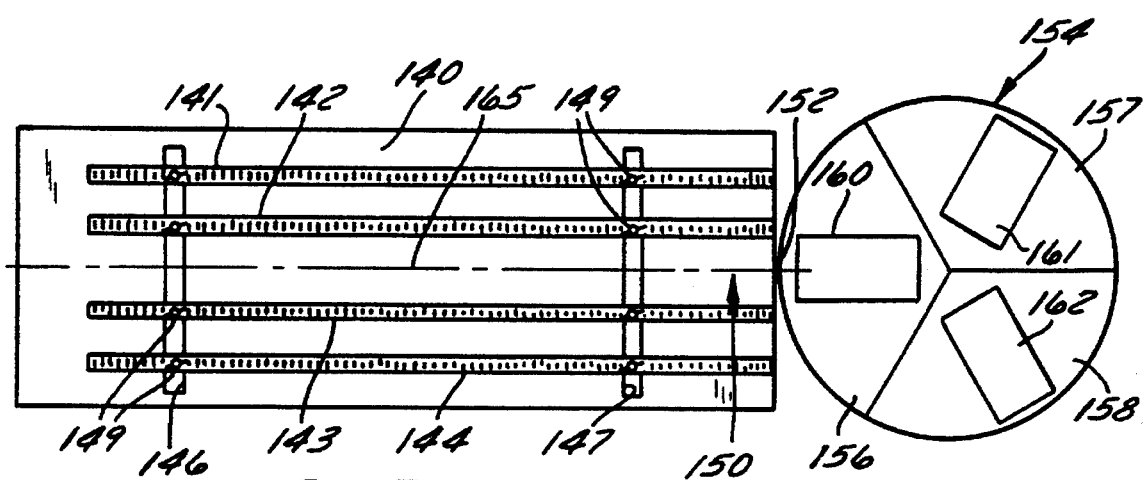
FIG. 7 is a schematic representation of a turn table technique for presenting a variety of window covering cutting devices in a confined space and representing another alternate form of the invention.

FIG. 7 shows in schematic form yet another embodiment of the invention, this one featuring a surface 140 having a plurality of movable ruler elements 141-145 spaced apart and parallel to one another. Each of the ruler elements is movable along a pair of tracks 146-147 in the surface 140 extending below and perpendicular to the ruler elements. Two clamping means, such as threaded clamps 149, are provided through each of the rulers with a portion (not shown) received within the tracks to facilitate locking the rulers at a specific location.

The rulers themselves may be marked in half length and full length increments as is known from the previous discussions. The movability of the rulers is provided so that a desired pair of them may be placed at a desired spacing to define a channel 150 ending at a central location generally designated as 152 in the drawing. At location 152, the perimetry of a round table 154 is disposed. In this illustration, table 154 is divided into three generally pie shaped segments 156–158, each of which in turn supports a window covering sizing device. The devices are shown as boxes 160–162 because the particular construction thereof, in and of itself, is not part of the present invention. The devices could be, for example, the vertical blind cutter, the mini blind cutter and the pleated shade cutter referred to earlier in this specification. Also not shown is any mechanism for permitting rotation of the turntable to locate one of the cutters (160–162) adjacent area 152. Also not shown is a lock for the table 154.

With this brief explanation, it can be easily understood how a window covering sizing operation can be performed using the embodiment shown in FIG. 7. First, the selection of a desirable cutter for the particular operation is made and the cutter is positioned at area 152. Following that step, the selection of the necessary ruler pair for making either a single cut or cuts from both ends of the window covering product would be made, and the rulers would be located equidistant from a centerline 165 passing through location 152. They would be tightened in place and the window covering placed in the channel resulting from the ruler selection process.

While the present invention has been illustrated in connection with a preferred and two alternate embodiments, it is not to be limited thereby but is to be limited solely by the scope of the claims which follow. Numerous changes in dimensions and location, and the particular components which comprise the cutting systems could be made by one skilled in the art without departing from this invention's intended scope.

What is claimed is:

1. An apparatus for sizing window coverings of the mini-blind, pleated shade, roller shade and vertical blind varieties, the apparatus including:

a support having first and second planar surfaces parallel to one another;

means for selectively rotating the support so that the first or the second surface is presented upwardly and generally horizontally;

a module for containing the support and for permitting rotation thereof;

at least a portion of a mini-blind sizing device located on the first surface of the support;

at least a portion of a pleated shade sizing device located on the second surface of the support;

a vertical blind sizing device located on the module; and a roller shade sizing device at least partially mounted on the module.

2. The apparatus of claim 1 wherein the roller shade sizing device includes a first and a second portion and wherein the first portion is mounted on the module and the second portion is mounted on one of the first or the second surfaces of the support.

3. The apparatus of claim 1 wherein the module further comprises means for storing window coverings to be sized.

4. The apparatus of claim 1 wherein the module includes at least one informational display area.

* * * * *